United States Patent Office 3,660,345
Patented May 2, 1972

---

3,660,345
ORGANOPOLYSILOXANE ELASTOMER COMPOSITIONS
William Joseph Bobear, Latham, N.Y., assignor to General Electric Company
No Drawing. Filed Sept. 9, 1968, Ser. No. 758,575
Int. Cl. C08f *11/04;* C08g *31/02*
U.S. Cl. 260—37 SB   10 Claims

ABSTRACT OF THE DISCLOSURE

Organopolysiloxane compositions are provided which are convertible to elastomers having high tear strength and resiliency comprising either a two component blend of a vinyl containing organopolysiloxane gum having minor amounts of chemically combined siloxy units with at least one vinyl radical attached to silicon, and a vinylpolysiloxane having up to major amounts of chemically combined siloxy units with at least one vinyl radical attached to silicon, or a three component blend comprising an organopolysiloxane gum free of chemically combined siloxy units with at least one vinyl radical attached to silicon in combination with the aforementioned two component blend.

---

The present invention relates to organopolysiloxane compositions convertible to elastomers having high tear strength and resiliency comprising blends of organopolysiloxanes having chemically combined siloxy units with at least one vinyl radical attached to silicon.

Organopolysiloxane elastomers are generally recognized for their outstanding ability to resist change at elevated temperature and exposure to adverse weather conditions over extended periods of time. In particular applications, however, such as aerodynamic seals and gaskets employed on aircraft, materials are needed which not only have the outstanding properties of organopolysiloxane elastomers, but also possess a satisfactory degree of toughness. Toughness can be measured by tear strength (pi) which is the ability of the rubber to withstand continual abrasion without breakdown in mechanical structure. In addition to toughness, elastomeric materials qualifying for aircraft use must have a satisfactory degree of resiliency, or ability to recover shape after deformation especially by compressive forces. Methylpolysiloxane elastomers have generally been recognized as materials possessing a satisfactory degree of resiliency but unsuitable for applications requiring both resiliency and a tear strength of at least 190 (pi). In order to improve the toughness of methylpolysiloxane elastomers, those skilled in the art have employed methylpolysiloxane polymers containing chemically combined siloxy units with phenyl radicals attached to silicon, such as diphenylsiloxy units, methylphenylsiloxy units, etc. in amounts of up to at least 10 mole percent. In such instances, improved tear strengths have been obtainable. Experience has shown that even though elastomers made from such methylphenylpolysiloxane are generally tougher than elastomers made from methylpolysiloxanes, the methylphenylpolysiloxane elastomers are generally less resilient. In addition, methylphenylpolysiloxane elastomers often do not possess the resistance to swell in various organic solvents possessed by methylpolysiloxane elastomers.

The present invention is based on the discovery that methylpolysiloxane elastomers having superior toughness and resiliency can be made from certain organopolysiloxane blends comprising methylpolysiloxanes which are either entirely free or can contain up to about 10 mole percent of chemically combined siloxy units with at least one phenyl radical attached to silicon. A methylpolysiloxane composition is employed comprising a two component blend of an organopolysiloxane gum having a minor amount of chemically combined siloxy units with at least one vinyl radical attached to silicon and a vinylpolysiloxane having up to a major amount of chemically combined siloxy units with at least one vinyl radical attached to silicon. A three component blend also is included having an organopolysiloxane gum free of chemically combined siloxy units with at least one vinyl radical attached to silicon, in combination with the aforementioned two component blend.

There is provided by the present invention, an organopolysiloxane elastomer composition comprising (A) 100 parts of an organopolysiloxane blend,
(B) 10 to 60 parts of silica filler, and
(C) 2 to 15 parts of an organosilicon process aid, where (A is a blend of at least two organopolysiloxanes each having up to 10 mole percent of chemically combined siloxy units with at least one phenyl radical attached to silicon selected from, A two component organopolysiloxane blend consisting essentially of (i) a vinyl containing organopolysiloxane gum component consisting essentially of from 0.01 to 0.6 mole percent of siloxy units with at least one vinyl radical attached to silicon of the formula, (1) 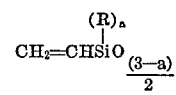

chemically combined with from 99.4 to 99.99 mole percent of organosiloxy units of the formula, (2) 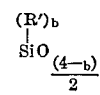

and (ii) a vinylpolysiloxane consisting essentially of up to a major amount of vinylmethylsiloxy units of the formula, (3) 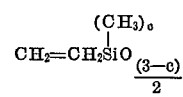

chemically combined with methylsiloxy units of the formula, (4) 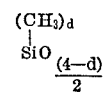

where (ii) is utilized in said two component blend in an amount sufficient to provide for from 1 percent to 3.5 percent by weight of said vinylmethylsiloxy units based on the weight of the blend, and a three component organopolysiloxane blend consisting essentially of (i) and (ii) in combination with (iii) a vinyl-free organopolysiloxane gum consisting essentially of chemically combined organosiloxy units of (i), where (iii) is utilized in said three component blend in an amount sufficient to provide for from 10 percent to 70 percent by weight of (iii) and from 30 percent to 90 percent by weight of (i), based on the weight of (i) and (iii) while (ii) is utilized in said three component blend in an amount sufficient to provide for from 0.1 percent to 3.5 percent by weight of said vinylmethylsiloxy units, based on the weight of (i), (ii) and (iii), R is a member selected from the class of methyl, vinyl and phenyl, R′ is a member selected from the class of methyl and phenyl, the ratio of the sum of vinyl and R radicals to silicon in (i), the ratio of methyl and vinyl radicals to silicon in (ii) and the ratio of R' radicals to silicon in (iii) can vary from 1.95 to 2.01 inclusive, $a$ and $c$ are whole numbers equal to 0 to 2 inclusive, and $b$ and $d$ are integers equal to 1 to 3 inclusive.

The organosilicon process aids which can be utilized in the practice of the invention are well known and include for example, silanol-terminated polydiorganosiloxanes, such as taught by Konkle et al. Patent 2,890,188, alkoxy-terminated polydiorganosiloxanes, such as taught by Fekete Pat. 2,954,357, and silazane, silylamine, or other silicon-nitrogen materials taught by Martellock Pat. 3,243,404 assigned to the same assignee as the present invention. Some of the silanol-terminated polydiorganosiloxanes which can be employed are for example, silanol-terminated polydimethylsiloxanes, and silanol-terminated polydiorganosiloxanes consisting essentially of chemically combined dimethylsiloxy units, methylphenylsiloxy units, or diphenylsiloxy units. In addition, the employment of such silanol-terminated polydiorganosiloxane, silanols such as diphenylsilanediol also can be employed. Experience has shown that silanol-terminated polydiorganosiloxane such as polydimethylsiloxane, polydiphenylsiloxane, polysiloxane consisting essentially of dimethylsiloxy and diphenylsiloxy, etc. can be employed having a ratio of silicon bonded hydroxy radicals to silicon atoms of from one hydroxy radical per 70 silicon atoms, to two hydroxy radicals per silicon atom. These silanol-terminated materials can be made by well known methods such as by hydrolyzing diorganodihalosilanes in the presence of acetone and an alkali bicarbonate such as shown by Duane Pat. 2,744,923.

The alkoxy-terminated polydiorganosiloxanes which can be employed in the practice of the invention as process aids such as taught by the aforementioned Fekete patent, are polysiloxanes having from about 4 to 35 chemically combined diorganosiloxy units terminated with alkoxy radicals. For example, suitable materials are alkoxy-terminated, such as methoxy, ethoxy, propoxy and butoxy terminated polydimethylsiloxane, polysiloxane consisting essentially of chemically combined dimethylsiloxy units, diphenylsiloxy units, methylphenylsiloxy units, etc. In addition to the aforementioned silanol-terminated and alkoxy-terminated diorganosiloxanes, the process aid of the present invention also includes materials such as silylamines, silazanes, etc. Some of these silazanes which can be employed are for example, cyclic silazanes, such as dimethylcyclotrisilazane, dimethylcyclotetrasilazane; linear silazane such as hexamethyldisilazane; 1,3 - diphenyl - tetramethyldisilazane, etc.; silylamines such as bis(amino)diphenylsilane, tris-aminomethylsilane, etc. Additional methods for making silazanes are shown by Sauer et al. JACS vol. 68, 1946, pages 241–44, Haber Patent 2,462,635, Cheronis Pat. 2,579,416, 2,579,417, and 2,579,418, etc. Mixtures of the aforementioned process aids also can be utilized such as a mixture of any two of the aforementioned process aids, or a mixture of the three process aids such as silanol-terminated polydimethylsiloxane, methoxy - terminated methylphenylpolysiloxane and hexamethyldisilazane.

The organopolysiloxane gums which can be employed in the practice of the invention to make either the two component or three component blend are well known materials and can be made by standard methods known to the art. For example, the vinyl-containing organopolysiloxane gum can be chain-stopped with vinylsiloxy units, such as dimethylvinylsiloxy units and be free of vinylsiloxy units in the chain. The vinyl-containing organopolysiloxane gum also can have vinylsiloxy units in the chain such a vinylmethylsiloxy units, or vinylphenylsiloxy units, and be free of vinylsiloxy chain-stopping units. The vinyl-containing organopolysiloxane gum also can have a combination of vinylsiloxy chain-stopping units and vinylsiloxy units in the chain. For example, included by the vinyl-containing gums are polydimethylsiloxanes having terminal dimethylvinylsiloxy units, polydimethylsiloxanes containing methylvinylsiloxy units in the chain and chain-stopped with trimethylsiloxy units or polydimethylsiloxanes chain-stopped with dimethylvinylsiloxy units and containing methylvinylsiloxy units in the chain. Such vinyl-containing gums also can have a minor amount of chemically combined phenylsiloxy units such as diphenylsiloxy units, methylvinylsiloxy units, methylphenylvinyl chain-stopping units and diphenylvinyl chain-stopping units. Preferably, the vinyl-containing organopolysiloxane gum is free of phenylsiloxy units, such as diphenylsiloxy units or methylphenylsiloxy units. The vinyl-containing gum also preferably has from 0.01 mole percent to 0.2 percent of chemically combined methylvinylsiloxy units in the form of chemically combined vinylsiloxy units such as methylvinylsiloxy units, dimethylvinylsiloxy units, vinylphenylsiloxy units, diphenylvinylsiloxy units and methylphenylvinylsiloxy units.

In addition to the vinyl-containing gum, the vinyl free organopolysiloxane gum is preferably a polydimethylsiloxane having trimethylsiloxy chain stopping units consisting essentially of chemically combined dimethylsiloxy units. The vinyl free organopolysiloxane gum also can consist essentially of a mixture of dimethylsiloxy units and a minor amount of methylphenylsiloxy units, diphenylsiloxy units or have terminal triphenylsiloxy units, diphenylsiloxy units or dimethylphenylsiloxy units. The vinyl-containing and vinyl free gum can have viscosities in the range of between 100,000 centipoises up to $2 \times 10^9$ centipoises at 25° C. These materials can contain minor amounts of methylsiloxy units or phenylsiloxy units, i.e., siloxy units having no more than one methyl or phenyl radical attached to silicon without adversely affecting the desirable properties of the gums.

The vinyl-containing and vinyl free organopolysiloxane gums of the present invention can be made by well known methods such as by the equilibration of methylcyclopolysiloxanes, mixtures of methylcyclopolysiloxanes and methylvinylcyclopolysiloxanes in combination with chain-stopping units such as derived from hexamethyldisiloxane, 1,3 - tetramethyldisiloxane, etc. Equilibration can be affected in the presence of standard equilibration catalysts such as potassium hydroxide, sodium hydroxide, phenylphosphoryl chloride, ferric chloride hexahydrate, etc. which is between about 25° C. to 160° C. for several hours or less. For example, a mixture of octamethylcyclotetrasiloxane - 1,3,5,7 - tetravinyl-1,3,5,7-tetramethylcyclotetrasiloxane and 1,3-tetramethyldisiloxane can be equilibrated with potassium hydroxide for about 4 hours at 160° C. to make the vinyl-containing organopolysiloxane gum. If desired, the organopolysiloxane gums also can be made in accordance with Goossens Pat. 3,305,525 assigned to the same assignee as the present invention involving the intercondensation of silanol-terminated polydiorganosiloxane, such as a polydimethylsiloxane, a polydiphenylsiloxane, mixtures of polydimethylsiloxane with methylvinylsiloxy units utilizing a silylamine coupling agent such as a bis-(amino)dimethylsilane, a bis-(amino)methylvinylsilane, etc.

Depending upon the manner by which the vinyl free or vinyl containing organopolysiloxane gums are made, these gums may have to be devolatilized by use of stripping procedures utilizing an inert gas purge along with the employment of a decatalyzing agent, such as shown by Boot Patent 3,153,007 assigned to the same assignee as the present invention.

The vinylpolysiloxane employed in combination with the above vinyl-containing organopolysiloxane gum or vinyl free organopolysiloxane gum to make the two component or three component organopolysiloxane blend can have a viscosity in the range of between 1 centipoise to 1 billion centipoises at 25° C. The vinylpolysiloxane can have from 2 mole percent to 100 mole percent of chemically combined vinylmethylsiloxy units, and preferably from 5 to 20 mole percent based on the total siloxy units in the vinylpolysiloxane. For example, the vinylpolysiloxane can be a fluid consisting essentially of chemically combined dimethylsiloxy units, methylvinylsiloxy units and chain-stopped with dimethylvinylsiloxy units. It can contain or be entirely free of siloxy units with phenyl attached to silicon. The vinylpolysiloxane can be made by standard equilibration methods utilized for making the above-desscribed organopolysiloxane gums. For example, 1,3,5,7-tetravinyl-1,3,5,7 - tetramethylcyclosiloxane can be equilibrated alone or in combination with octamethylcyclotetrasiloxane while utilizing a source of chain-stopping radicals such as 1,3-divinyltetramethyldisiloxane or hexamethyldisiloxane. There can be employed standard equilibration catalysts such as alkali metal hydroxides. For example, potassium hydroxide at concentrations of from 10 to 20 parts of alkali hydroxide per million of mixture. Equilibration can be achieved over a period of several hours such as from 3 to 10 hours or more at temperatures in the range of between about 100 to 150° C. In order to provide for effective results when utilizing the vinylpolysiloxane it has been found desirable to employ in the equilibration mixture at least about 2 mole percent of vinylsiloxy units to provide for a vinylpolysiloxane polymer which can be employed effectively in making either the two component or three component organopolysiloxane blend. The vinylpolysiloxane also can contain up to 100 mole percent of siloxy units with at least one vinyl radical attached to silicon along with one or two methyl radicals. Preferably, the vinyl polysiloxane is free of phenyl radicals attached to silicon.

In addition to the various organopolysiloxanes described above utilized in making the organopolysiloxane blend, the organopolysiloxane compositions also can contain silica fillers, or a mixture of silica filler with an extending filler. The employment of a silica filler or referred to sometimes as reinforcing filler, amounts to between about 10 parts to about 60 parts and preferably 25 to 55 parts, has been found effective for imparting improved tensile strength and toughness in the final cured organopolysiloxane elastomer. Examples of silica filler which can be utilized to reinforce the organopolysiloxane blend of the present invention include for example, fumed silica, precipitated silica, silica aerogel, etc. In addition to the employment of a reinforcing filler, extending or nonreinforcing fillers can be employed in combination thereof in amounts equal to from 0 to 200 parts, so that the total parts by weight of reinforcing and nonreinforcing fillers can equal from 10 parts to 260 parts of fillers, per 100 parts of organopolysiloxane. In addition to the employment of filler, there also can be utilized in combination with the organopolysiloxane blend and process aid heat stabilizers such as iron oxide, aryl urethanes, nickel, copper or tungsten salts or oxides such as taught by Bobear Patent 3,098,836, mixtures of rare earth chlorides, and mixtures of rare earth oxides such as taught by Bobear Patent 3,142,655 assigned to the same assignee as the present invention. Various curing agents that can be employed to effect the more rapid conversion of the organopolysiloxane compositions to the cured solid elastic state are for example, benzoyl peroxide, 2,5-dimethyl, 2,5-ditertiarybutylperoxyhexane, tertiary butylperbenzoate, bis-(2,4-dichlorobenzoyl)peroxide, ditertiarybutyl peroxide, dicumyl peroxide, tertiarybutylperoxyisopropyl carbonate, etc. These curing agents are vulcanization accelerators as they are often designated and can be present in the organopolysiloxane compositions in amounts ranging from about 0.1 to as high as 4 to 8 parts or more based on 100 parts of organopolysiloxane blend. High energy electron radiation without curing agents can also be employed to convert the organopolysiloxane composition to the cured solid elastic state.

In the practice of the invention, the organopolysiloxane composition is produced by milling together components utilized in making the organopolysiloxane blend along with the filler, process aid, heat stabilizer, peroxide curing agent, etc. The order of the addition of the various components of the mixture is not critical. If desired, the various ingredients of the organopolysiloxane composition can be doughmixed together utilizing temperatures in the range of between 25° C. to 200° C.

Organopolysiloxane compositions can be converted to a solid elastomeric state at temperatures in the range of from 115° C. to 315° C. depending upon the nature of the curing catalyst, duration of cure, amount and type of filler, etc.

In order that those skilled in the art will be better able to practice the invention, the following examples are given by way of illustration and not by way of limitation. All parts are by weight.

EXAMPLE 1

A mixture of 100 parts of a vinyl-containing polydimethylsiloxane gum having dimethylvinylsiloxy chain-stopping units and consisting essentially of dimethylsiloxy units, 7 parts of a methoxy-terminated polydimethyl siloxane, 30 parts of fumed silica and 2 parts of iron oxide is heated for 3 hours at 160° C. There is added to 100 parts of the resulting mixture, 0.9 part of 1,3,5,7-tetravinyl-1,3,5,7-tetramethylcyclotetrasiloxane and one part of 2,4-dichlorobenzoyl peroxide. Slabs are prepared from the resulting composition which are press-cured for 10 minutes at 260° F. Elastomers having the following properties are obtained, where H is hardness (Shore A), T is tensile (p.s.i.), E is elongation (percent), T' is tear (pi) and B is Bayshore Resilience:

Press cure:
H _____ 30
T _____ 1600
E _____ 800
T' _____ 210
B _____ 44

The above procedure is repeated except that slabs are prepared from a composition free of the 1,3,5,7-tetravinyl - 1,3,5,7 - tetramethylcyclotetrasiloxane. Elastomers are made having the following properties after the same press cure:

Press cure:
H _____ 37
T _____ 1700
E _____ 620
T' _____ 94
B _____ 58

EXAMPLE 2

A methylpolysiloxane composition is prepared by milling 100 parts of a two component methylpolysiloxane blend with 40 parts of fumed silica and 8 parts of a process aid consisting of a mixture of 3 parts of a silanol-terminated polydimethylsiloxane fluid having a viscosity of about 25 centipoises at 25° C., 4 parts of a methoxy-terminated polydimethylsiloxane having a viscosity of about 10 centipoises at 25° C., and 1 part of hexamethyldisilazane.

The two component methylpolysiloxane blend consists essentially of 80 parts of a vinyl-containing polydimethylsiloxane gum and 20 parts of a vinylpolysiloxane. The polydimethylsiloxane gum has 0.6 mole percent of chemically combined methylvinylsiloxy units chemically combined with about 99.4 mole percent of chemically combined dimethylsiloxy units and chain-stopped with dimethylvinylsiloxy units and a viscosity of 20 million centipoises at 25° C. The vinylpolysiloxane has a viscosity of about 1 million centipoises at 25° C., and consists essentially of 13.5 mole percent of methylvinylsiloxy units chemically combined with 86.5 mole percent of dimethylsiloxy units. Based on method of preparation, the two component blend contains about 3.08 mole percent of chemically combined methylvinylsiloxy units derived from the vinylpolysiloxane based on weight of the vinyl-containing polydimethylsiloxane and the vinylpolysiloxane.

While milling the organopolysiloxane composition consisting essentially of the two component blend, filler and process aid, there is added 2 parts of iron oxide along with 1.4 part 2,4-dichlorobenzoyl peroxide.

Another methylpolysiloxane composition is prepared following the same procedure except in place of 100 parts of the two component blend consisting essentially of 80 parts of the vinyl-containing polydimethylsiloxane gum and 20 parts of the vinylpolysiloxane, there is employed 100 parts of the vinyl-containing polydimethylsiloxane gum. Slabs are cut from milled sheets obtained from the respective methylpolysiloxane compositions utilizing the two component blend, and the vinyl-containing polydimethsiloxane gum free of the vinylpolysiloxane. The slabs of both compositions are press-cured for 10 minutes at 400° F., and then oven-cured for 2 hours at 400° F. The following results are obtained with the composition utilizing the two component blend made in accordance with the present invention, where H, T, E, T' and B are as previously defined:

Press cure+oven cure:
H _____ 48
T _____ 1370
E _____ 700
T' _____ 233
B _____ 45

The following results are obtained with the composition utilizing the vinyl-containing polydimethylsiloxane without the use of the vinyl polysiloxane in accordance with the method of the prior art:

Press cure+oven cure:
H _____ 52
T _____ 1483
E _____ 450
T' _____ 99
B _____ 50

EXAMPLE 3

A methylpolysiloxane composition is prepared by milling 100 parts of a three component methylpolysiloxane blend with 45 parts of fumed silica and 8 parts of the process aid consisting of a mixture of 3 parts of a silanol-terminated polydimethylsiloxane fluid made by hydrolyzing dimethyldichlorosilane, 4 parts of a methoxy-terminated polydimethylsiloxane fluid and 1 part of hexamethyldisilazane.

The three component blend consists essentially of 48.5 parts of a vinyl-containing polydimethylsiloxane gum, 1½ parts of a vinyl methylpolysiloxane polymer, and 50 parts of a vinyl free polydimethylsiloxane gum having terminal trimethylsiloxy units and a viscosity of 20 million centipoises at 25° C. The vinyl-containing polydimethylsiloxane gum has a viscosity of about 300 million centipoises at 25° C. and chain-stopped with dimethylvinylsiloxy units. The vinylpolysiloxane has a viscosity of about 9 million centipoises at 25° C., trimethylsiloxy chain-stopping units and about 13.5 mole percent of chemically combined methylvinylsiloxy units and 86.5 mole percent of dimethylsiloxy units. Based on method of preparation, the three component blend contains about 0.23 percent by weight of methylvinylsiloxy units derived from the vinylpolysiloxane based on the weight of the three component blend.

While milling the organopolysiloxane composition of the three component blend, filler and process aid, 0.25 parts of a solution of rare earth octoate salts is incorporated into the mixture along with 2,5-dimethyl-2,5-ditertiarybutylperoxyhexane.

Slabs are cut from milled sheets from the methylpolysiloxane composition utilizing the three component blend. The slabs are press-cured for 10 minutes at 287° F. and then oven-cured for 2 hours at 400° F. The following results are obtained where H, T, E, T' and B are as defined above:

Press cure+oven cure:
H _____ 50
T _____ 1650
E _____ 710
T' _____ 190
B _____ 43

EXAMPLE 4

A methylpolysiloxane composition is prepared by milling together 100 parts of a two component methylpolysiloxane blend with 38 parts of fumed silica and 12 parts of a process aid consisting essentially of a mixture of 10 parts of a methoxy-terminated polysiloxane fluid having a viscosity of about 10 centipoises at 25° C., and 2 parts of hexamethyldisilazane. There is also incorporated into the mixture during milling, 0.25 part of a mixture of rare earth octoate salts, 0.6 part of bis-(2,4-trichlorobenzoyl) peroxide.

The two component methylpolysiloxane blend utilized in the above organopolysiloxane composition consists essentially of 90 parts of a vinyl-containing polydimethylsiloxane gum and 10 parts of a vinylpolysiloxane. The polydimethylsiloxane gum has a viscosity of about 20 million centipoises at 25° C., 0.05 mole percent of chemically combined vinyl methylsiloxy units and chain-stopped with dimethylvinylsiloxy units. The vinylpolysiloxane has a viscosity of about 15 million centipoises at 25° C., and it is chain-stopped with trimethylsiloxy units and contains about 13.5 mole percent of chemically combined methylvinylsiloxy units and about 86.5 mole percent of chemically combined dimethylsiloxy units. Based on method of preparation, the two component blend contains about 1.5 weight percent of methylvinylsiloxy units derived from the vinylpolysiloxane.

Slabs are cut from milled sheets of the organopolysiloxane composition. The slabs are press-cured and oven-cured in accordance with the method of Example 1. The following table shows the results obtained with the organopolysiloxane composition containing the two component methylpolysiloxane blend where the terms employed are as defined above:

Press cure+oven cure:
H _____ 53
T _____ 1440
E _____ 530
T' _____ 220
B _____ 51

EXAMPLE 5

An organopolysiloxane composition is prepared by milling 100 parts of a two component methylpolysiloxane blend with 40 parts of fumed silica and 8 parts of a process aid in the form of a mixture of 3 parts of a methoxy-terminated polydimethylsiloxane, 4 parts of a silanol-terminated polydimethylsiloxane and 1 part of hexamethyldisilazane. While milling the mixture, there is also incorporated 0.25 part of a mixture of rare earth octoate metal salts and 0.4 part of bis - (2-4-dichlorobenzoyl) peroxide.

The two component methylpolysiloxane blend consists essentially of 95.95 parts of a vinyl-containing polydimethylsiloxane gum having about 0.2 mole percent of chemically combined methylvinylsiloxy units and chain-stopped with dimethylvinylsiloxy units, and 4.05 parts of a vinylpolysiloxane consisting essentially of about 50 mole percent of methylvinylsiloxy units chemically combined with about 50 mole percent of dimethylsiloxy units and chain-stopped with trimethylsiloxy units. The composition is cured up in accordance with the procedure of Example 1, and an elastomer having the following properties is obtained, where the terms employed are as defined above:

Press cure + oven cure:

```
H _____ 44
T _____ 1215
E _____ 710
T' _____ 204
B _____ 40
```

EXAMPLE 6

An organopolysiloxane composition is prepared by milling 100 parts of a three component methylpolysiloxane blend with 45 parts of fumed silica and 9 parts of a process aid consisting essentially of 3 parts of a methoxy-terminated polydimethylsiloxane, 4 parts of a silanol-terminated polydimethylsiloxane, and 2 parts of hexamethyldisilazane.

The three component methylpolysiloxane blend consists essentially of 70 parts of a vinyl-containing polysiloxane gum, 23.2 parts of a vinyl free polysiloxane gum and 6.8 parts of a vinylpolysiloxane. The vinyl-containing polysiloxane gum consists essentially of 5.3 mole percent of diphenylsiloxy units chemically combined with 94.7 mole percent of dimethylsiloxy units and chain-stopped with dimethylvinylsiloxy units. The vinyl free polysiloxane gum consists essentially of 5.3 mole percent of diphenylsiloxy units chemically combined with 94.7 dimethylsiloxy units and chain-stopped with trimethylsiloxy units. The vinylpolysiloxane has a viscosity of 1 million centipoises at 25° C. and consists essentially of 13.5 mole percent of methylvinylsiloxy units chemically combined with 86.5 mole percent of dimethylsiloxy units and chain-stopped with trimethylsiloxy units.

While milling the organopolysiloxane composition containing the three component blend, there is incorporated about 2 parts of iron oxide and 0.6 part of 2,5-dimethyl-2,5-ditertbutylperoxyhexane. Slabs are prepared from the organopolysiloxane composition and cured in accordance with the procedure of Example 2. There is obtained an elastomer having a hardness of 50, a tensile of 1540, an elongation of 686, a tear of 245 and a Bayshore Resilience of 46.

EXAMPLE 7

A methylpolysiloxane composition is prepared by milling 100 parts of a three component methylpolysiloxane blend with 36 parts of fumed silica and 4 parts of a silanol-terminated polydimethylsiloxane.

The three component blend consists essentially of 70 parts of a polydimethylsiloxane gum having terminal dimethylvinylsiloxy units, 23.2 parts of a polydimethylsiloxane gum having terminal trimethylsiloxy units and 6.8 parts of a vinylpolysiloxane having a viscosity of one million centipoises at 25° C. and 13.5 mole percent of vinylmethylsiloxy units chemically combined with 86.5 mole percent of dimethylsiloxy units.

While milling the methylpolysiloxane composition, there is incorporated 2 parts of iron oxide, and 0.4 part of benzoyl peroxide. Slabs made from the resulting composition are press-cured. The resulting elastomers have substantially improved tear strengths, as compared to compositions made in accordance with the same method, which are made utilizing a two component vinylpolysiloxane free blend consisting essentially of 70 parts of the vinyl-containing organopolysiloxane gum, and 30 parts of the vinyl free organopolysiloxane gum.

EXAMPLE 8

A methylpolysiloxane composition is prepared by milling 100 parts of a two component methylpolysiloxane blend with 38 parts of fumed silica, 20 parts of a 5 micron minusil and 12 parts of a mixture of a methoxy-terminated polydimethylsiloxane having a viscosity of 10 centipoises at 25° C. and 2 parts of hexamethylcyclotrisilazane.

The two component blend consists essentially of 90 parts of a vinyl-containing polydimethylsiloxane gum having a viscosity of about 20 million centipoises at 25° C., 0.05 mole percent of chemically combined vinylmethylsiloxy units and chain-stopped with dimethylvinylsiloxy units and 10 parts of a vinylpolysiloxane. The vinylpolysiloxane has a viscosity of 15 million centipoises at 25° C., 13.5 mole percent of chemically combined methylvinylsiloxy units and chain-stopped with trimethylsiloxy units.

While milling the methylpolysiloxane composition, there is incorporated 2 parts of iron oxide and 0.4 part of benzoyl peroxide. Slabs are made from the resulting formulation which are press-cured and oven baked. Slabs are also made from a methylpolysiloxane composition free of the vinylpolysiloxane following the same procedure utilizing 100 parts of the vinyl-containing polydimethylsiloxane. The slabs made with the two component blend in accordance with the invention are found to have substantially higher tear strength than the elastomers made from the formulation free of the vinylpolysiloxane.

While the foregoing examples have been limited to only a few of the very many variables within the scope of the present invention, it should be understood that the present invention is directed to a much broader class of organopolysiloxane compositions comprising two and three component blends, various process aids and mixtures thereof, etc.

What I claim as new and desire to secure by Letters Patent of the United States is:

1. An organopolysiloxane elastomer composition comprising (A) 100 parts of an organopolysiloxane blend,
(B) 10 to 60 parts of silica filler, and
(C) 2 to 15 parts of an organosilicon process aid, where (A) is a blend of at least two organopolysiloxanes each having up to 10 mole percent of chemically combined siloxy units with at least one phenyl radical attached to silicon selected from, a two component organopolysiloxane blend consisting essentially of (i) a vinyl-containing organopolysiloxane gum component consisting essentially of from 0.01 to 0.6 mole percent of siloxy units with at least one vinyl radical attached to silicon of the formula, (1) 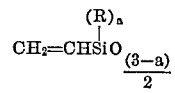

chemically combined with from 99.4 to 99.99 mole percent of organosiloxy units of the formula, (2) 

and (ii) a vinylpolysiloxane consisting essentially of up to a sufficient amount of vinylmethylsiloxy units of the formula, (3) 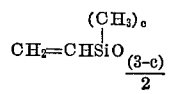

chemically combined with methylsiloxy units of the formula, (4) 

where (ii) is utilized in said two component blend in an amount sufficient to provide for from 1 percent to 3.5 percent by weight of said vinylmethylsiloxy units based on the weight of the blend, and a three component organopolysiloxane blend consisting essentially of (i) and (ii) in combination with (iii) a vinyl-free organopolysiloxane gum consisting essentially of chemically combined organosiloxy units of (i), where (iii) is utilized in said three component blend in an amount sufficient to provide for from 10 percent to 70 percent by weight of (iii) and from 30 percent to 90 percent by weight of (i), based on the weight of (i) and (iii) while (ii) is utilized in said three component blend in an amount sufficient to provide for from 0.1 percent to 3.5 percent by weight of said vinylmethylsiloxy units, based on the weight of (i), (ii), and (iii), R is a member selected from the class of methyl, vinyl and phenyl, R' is a member selected from the class of methyl and phenyl, the ratio of the sum of vinyl and R radicals to silicon in (i), the ratio of methyl and vinyl radicals to silicon in (ii) and the ratio of R' radicals to silicon in (iii) can vary from 1.95 to 2.01 inclusive, $a$ and $c$ are whole numbers to 0 to 2, inclusive, and $b$ and $d$ are integers equal to 1 to 3, inclusive.

2. An organopolysiloxane elastomer composition in accordance with claim 1, comprising a two component organopolysiloxane blend.

3. An organopolysiloxane elastomer composition in accordance with claim 1, comprising a three component organopolysiloxane blend.

4. An organopolysiloxane elastomer composition in accordance with claim 1, where the vinylpolysiloxane contains from about 5 mole percent to 20 mole percent of chemically combined vinylmethylsiloxy units.

5. An organopolysiloxane elastomer composition in accordance with claim 1, where the silica filler is fumed silica.

6. An organopolysiloxane elastomer composition in accordance with claim 1, where the process aid is a mixture of a silanol-terminated polydiorganosiloxane, alkoxy-terminated polydiorganosiloxanes, and silazane.

7. An rganopolysiloxane elastomer composition in accordance with claim 1, comprising (A) 100 parts of a two component organopolysiloxane blend (B) 30 to 45 parts of fumed silica, and (C) 4 to 10 parts of a mixture of a methoxy-terminated polysiloxane consisting essentially of chemically combined dimethylsiloxy units, a silanol-terminated polydimethylsiloxane, and hexamethyldisilazane, where said two component blend consists essentially of a vinyl-containing polydimethylsiloxane gum and a vinylpolysiloxane, where the vinyl-containing polydimethylsiloxane gum is chain-stopped with dimethylvinylsiloxy units and consists essentially of chemically combined dimethylsiloxy and the vinylpolysiloxane consists essentially of about 5 to 20 percent of methylvinylsiloxy units chemically combined with about 95 to 80 percent of chemically combined dimethylsiloxy units.

8. An organopolysiloxane composition in accordance with claim 1, comprising (A) 100 parts of a three component organopolysiloxane blend, (B) 30 to 45 parts of fumed silica, and (C) 4 to 10 parts of a mixture of a methoxy-termined polysiloxane consisting essentially of chemically combined dimethylsiloxy units, a silanol-terminated polydimethylsiloxane and a hexamethyldisilazane, where the three component organopolysiloxane blend consists essentially of 50 to 80 parts of a vinyl-containing polydimethylsiloxane gum having terminal dimethylvinylsiloxy units, 20 to 50 parts of a polydimethylsiloxane gum having terminal trimethylsiloxy units, and about 6 to 20 parts of a vinylpolysiloxane having about 13.5 mole percent of chemically combined methylvinylsiloxy units and 86.5 chemically combined dimethylsiloxy units.

9. A composition in accordance with claim 1, where the vinyl-containing organopolysiloxane gum and the vinyl-free organopolysiloxane gum has up to 5.3 mole percent of chemically combined siloxy units.

10. A composition in accordance with claim 1, where the vinyl-containing organopolysiloxane gum has terminal dimethylvinylsiloxy units and up to about 0.2 mole percent of chemically combined methylvinylsiloxy units.

References Cited

UNITED STATES PATENTS

| | | | |
|---|---|---|---|
| 2,890,188 | 6/1959 | Konkie et al. | 260—37 Si |
| 2,954,357 | 9/1960 | Fekete | 260—29.1 |
| 3,243,404 | 3/1966 | Martellock | 260—37 Si |
| 3,284,406 | 11/1966 | Nelson | 260—825 |
| 3,436,366 | 4/1969 | Modic | 260—825 |
| 3,305,525 | 2/1967 | Goossens | 260—46.5 |
| 3,498,945 | 3/1970 | Lefort et al. | 260—46.5 U X |
| 3,377,306 | 4/1968 | Hyde | 260—37 SB X |
| 3,377,311 | 4/1968 | Roch | 260—37 SB |
| 3,464,950 | 9/1969 | Wegehaupt | 260—37 SB |

MORRIS LIEBMAN, Primary Examiner

S. M. PERSON, Assistant Examiner

U.S. Cl. X.R.

260—46.5 G, 46.5 UA, 825